(12) United States Patent
Park et al.

(10) Patent No.: US 12,085,939 B2
(45) Date of Patent: Sep. 10, 2024

(54) SYSTEM AND METHOD OF OPERATING AUTOMATED GUIDED VEHICLE

(71) Applicants: Hyundai Motor Company, Seoul (KR); Kia Corporation, Seoul (KR)

(72) Inventors: Kyung Dong Park, Hwaseong-si (KR); Sang Won Yoon, Suwon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 365 days.

(21) Appl. No.: 17/539,475

(22) Filed: Dec. 1, 2021

(65) Prior Publication Data

US 2022/0187831 A1   Jun. 16, 2022

(30) Foreign Application Priority Data

Dec. 16, 2020 (KR) .......................... 10-2020-0175974

(51) Int. Cl.
*G05D 1/00* (2024.01)
*B62D 65/02* (2006.01)
*G05B 19/418* (2006.01)

(52) U.S. Cl.
CPC ......... *G05D 1/0212* (2013.01); *B62D 65/022* (2013.01); *G05B 19/41895* (2013.01); *G05B 2219/1128* (2013.01)

(58) Field of Classification Search
None
See application file for complete search history.

(56) References Cited

U.S. PATENT DOCUMENTS

| 9,014,902 B1* | 4/2015 | Murphy | G05D 1/0234 |
| | | | 701/26 |
| 2017/0052518 A1* | 2/2017 | Wang | G05B 19/4183 |
| 2020/0183371 A1* | 6/2020 | Park | G05D 1/0229 |

(Continued)

FOREIGN PATENT DOCUMENTS

| KR | 10-2013-0009430 A | 1/2013 |
| KR | 10-1495612 B1 | 2/2015 |

(Continued)

OTHER PUBLICATIONS

Machine translation of WO2023/282254 (Year: 2024).*

(Continued)

*Primary Examiner* — Isaac G Smith
*Assistant Examiner* — Jennifer M Anda
(74) *Attorney, Agent, or Firm* — MORGAN, LEWIS & BOCKIUS LLP (57) ABSTRACT

A system and a method of operating an automated guided vehicle includes: an Automated Guided Vehicle (AGV) which is loaded with a component and transfers the component along a set travelling path in a vehicle production factory; a Programmable Logic Controller (PLC) which is provided in a process line and each of a plurality of nodes existing on the travelling path and controls a peripheral automation facility; and an operation server which is configured to control an operation of the AGV and each automation facility through the PLC, and sets a PLC control condition for controlling each automation facility for each section by collecting PLC memory data from the PLC and inquiring the PLC memory data based on a movement position of the AGV when the travelling path is set.

16 Claims, 6 Drawing Sheets

(56) References Cited

U.S. PATENT DOCUMENTS

2022/0089237 A1\* 3/2022 Sverdlov ................ B25J 9/1697
2023/0273603 A1\* 8/2023 Arzich ................... G05D 1/617
                                                            700/97

FOREIGN PATENT DOCUMENTS

| KR | 10-2016-0097798 A | 8/2016 |
| KR | 10-2017-0119490 A | 10/2017 |
| KR | 10-2018-0093155 A | 8/2018 |
| WO | WO-2023282254 A1 \* | 1/2023 |

OTHER PUBLICATIONS

Machine translation of KR10-2018-0093155 (reference provided in IDS) (Year: 2024).\*
Machine translation of KR10-1495612 (reference provided in IDS) (Year: 2024).\*

\* cited by examiner

PLC state data-based path travelling condition setting function

Reference AGV ID: AGV1

PLC memory map ID: ROOF_PLT1_DOWN_END    PLC memory map road (read) value: TRUE

※ Operation conditional statement configuration (configuration of plural conditions)

| Order | PLC memory map ID | PLC memory map value | Overlapping condition (AND, OR) | Registration date |
|---|---|---|---|---|
| 1 | ROOF_PLT1_UP_END | TRUE | AND | 2019-02-24 07:32:22 |
| 2 | ROOF_PLT1_DOWN_END | FALSE | AND | 2019-02-12 12:22:11 |

Add    Remove

Travelling path of AGV operation: N12-N22-N32-N31-N41 — Green

☑ Set whether to use AGV process entrance interlock (RCS→PLC)

| Add/remove interlock use condition | Order | Entrance node | (Condition) PLC memory map ID | Condition value (if) | (Execution) PLC memory map ID | Condition value (execution) | Yellow | Registration date | Select |
|---|---|---|---|---|---|---|---|---|---|
| | 1 | N41 | ROOF_PLT1_SAFETY_CHECK | TRUE | ROOF_PLT1_SAFETY_CHECK | TRUE | | 2019-02-24 07:32:22 | ☐ |
| | 2 | N44 | ROOF_PLT1_SAFETY_CHECK | FALSE | ROOF_PLT1_SAFETY_CHECK | FALSE | | 2019-02-12 12:22:11 | ☐ |

Add    Change

↑ Door ON/Off control function by using corresponding interlock function

Process entrance interlock use setting

| Order | PLC memory map ID'S | PLC memory map value S | Overlapping condition (AND,OR)'S | Travelling path | Entrance node | Condition memory map | Map load (read) value | Memory map ID | Map output (write) value | Registration date |
|---|---|---|---|---|---|---|---|---|---|---|
| 1 | ROOF_PLT1_UP_END, ROOF_PLT1_DOWN_END, | TRUE, FALSE | AND, AND | 1900-1800-1700-1701 | N41 | ROOF_PLT1_FAF ETY_CHECK | FALSE | ROOF_PLT1_FAF ETY_CHECK | TRUE | 2019-02-24 07:32:22 |
| 2 | ROOF_PLT1 ON | TRUE | AND | 1701-1700-1800-1900 | N44 | ROOF_PLT1_FAF ETY_CHECK | FALSE | ROOF_PLT1_FAF ETY_CHECK | TRUE | 2019-02-12 12:22:11 |

Full inquiry    Remove

SYSTEM AND METHOD OF OPERATING AUTOMATED GUIDED VEHICLE

CROSS-REFERENCE TO RELATED APPLICATION

The present application claims priority to Korean Patent Application No. 10-2020-0175974 filed on Dec. 16, 2020, the entire contents of which is incorporated herein for all purposes by this reference.

BACKGROUND OF THE INVENTION

Field of the Invention

The present invention relates to a system and method of operating an automated guided vehicle, and more particularly, to a system and method of operating an automated guided vehicle which performs PLC memory control for each movement position of an industrial transportation vehicle.

Description of Related Art

In a smart factory-based vehicle production factory, various components are assembled by modularizing the automation process. Furthermore, to smoothly transfer the components for each process, an Automated Guided Vehicle (AGV) is operated. In the automation process, when a component supply is interrupted during operation, a production line is shut down, which adversely affects the yield. Accordingly, it is important to transfer the component in the right place at the right time through operation of the AGV.

The AGV loaded with components moves to a destination along a guide line provided on the floor. For example, the AGV moves along a set transfer path by use of a sensor which detects magnetic force of a magnetic guide line. In the transfer path, a plurality of nodes that the AGV needs to essentially pass through from a departure point to a destination may be sequentially set.

In the meantime, conventionally, when the AGV for operating a factory line is introduced, there is no technology for operating the AGV that meets operation conditions of various surrounding facilities for each process, and thus there is a problem in that the AGV interferes or collides with process facilities and a stop event of the AGV frequently occurs.

Furthermore, conventionally, there is a problem in that an operator does not immediately know the stop event of the AGV or even if the operator recognize the stop event, it is difficult to recognize the reason of the stop event.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a system and a method of operating an automated guided vehicle, which collects state information of a Programmable Logic Controller (PLC) disposed in a vehicle production factory and sets a PLC memory value to interwork with a PLC for each section according to setting of an operation path of an Automated Guided Vehicle (AGV), and controls an operation of a facility for each section according to a movement position of the AGV through the PLC.

Various aspects of the present invention are directed to providing a system for operating an automated guided vehicle, the system including: an Automated Guided Vehicle (AGV) which is loaded with a component and transfers the component along a set travelling path in a vehicle production factory; a Programmable Logic Controller (PLC) which is provided in a process line and each of a plurality of nodes existing on the travelling path and controls a peripheral automation facility; and an operation server which is configured to control an operation of the AGV and the automation facility through the PLC, and sets a PLC control condition for controlling the automation facility for each section by collecting PLC memory data from the PLC and inquiring the PLC memory data based on a movement position of the AGV when the travelling path is set.

Furthermore, the AGV may include: a transmission module which is configured to receive the travelling path according to work allocation of the operation server and transmits a movement position during travelling; and a driving module which is configured to store a factory map MAP and a coordinate for each node to which the AGV is configured for moving and controls a driving device to control a movement on a transfer path.

Furthermore, the travelling path may include the plurality of nodes including a start point, one or more via-points, and an end point which the AGV needs to sequentially travels.

Furthermore, the travelling path may include a supply path to which the component is transferred from a component warehouse to the process line based on a coordinate system of the factory map MAP, and a regression path through which the AGV returns in a reverse order.

Furthermore, the PLC may include a PLC memory controller in which stores a conditional statement-based program for controlling an operation of the automation facility is stored and which stores log information according to a current operation state and an operation history of the automation facility in a PLC memory.

Furthermore, the PLC memory controller may recognize the operation state of the automation facility and the movement position of the AGV, and controls an operation or a stop of the automation facility according to whether a condition set in the PLC memory is satisfied.

Furthermore, the operation server may include: a PLC communication module which is configured to collect each set PLC memory data by performing communication with the PLC; an AGV communication module which is configured to collect a real-time movement position of the AGV by performing communication with the AGV; a path setting unit which is configured to generate the travelling path of the AGV for transferring the component for each process line; a travelling condition setting unit which is configured to set a memory address of the PLC memory and a PLC control condition for an operation of a function of the automation facility for each section according to the travelling path, and to set an AGV travelling condition for interworking with the PLC control condition; a database DB which stores various programs and PLC memory data for operating the AGV; and a controller which is configured to control a general operation of each unit of operating the AGV, and controls the operation of the automation facility by designating a PLC memory address of the PLC for each section according to the movement position of the AGV and transmitting a PLC control condition.

Furthermore, the travelling condition setting unit may include a user interface UI in which an input environment for setting the PLC control condition and the AGV travelling condition for each node of the travelling path is programmed.

Furthermore, the UI of the travelling condition setting unit may display a screen, which includes a start point condition setting module, a via-point condition setting module, and an end point condition setting module for the traveling path, for setting the PLC control condition by a user on a display.

Furthermore, the UI of the travelling condition setting unit may inquire the PLC control condition registered for a start point, a via-point, and an end point based on the movement position on the travelling path of the AGV by referring to the collected PLC memory data and display the PLC control condition to the user.

Furthermore, the UI of the travelling condition setting unit may perform pre-monitoring by checking check whether a PLC memory value according to the setting of the PLC control condition meets the operation of the AGV, and when the PLC memory value according to the setting of the PLC control condition does not meet the operation of the AGV, the UI of the travelling condition setting unit may display error occurrence by color and alarm the alarm occurrence to the user.

Furthermore, the UI of the travelling condition setting unit may set an interlock control condition which temporarily stops the AGV or a process facility when the process facility is being operated before the AGV enters the end point of the travelling path.

Various aspects of the present invention are directed to providing a method of operating an Automated Guided Vehicle (AGV) in which an operation server of a vehicle production factory transfers a component, the method including: a) selecting an AGV in consideration of a type and a size of the component when component transfer work is planned, and generating a travelling path from a start point to an end point thereof; b) collecting each Programmable Logic Controller (PLC) memory data from a PLC which is provided for each of a plurality of nodes existing on the travelling path and controls a surrounding automation facility; c) inquiring the PLC memory data and setting a PLC control condition for operating the automation facility for each section based on a movement position of the AGV; and d) transmitting the PLC control condition matched to a memory address of the PLC for each section, and transmitting the travelling path and an operation condition for each section to the AGV.

Furthermore, the operation c) may include adding an interlock control condition for selectively stopping a facility through the AGV or PLC immediately before the AGV enters a node among the plurality of nodes based on the movement position.

Furthermore, the operation c) may include checking whether the operation of the AGV for each section meets the PLC control condition when the PLC control condition is set.

Furthermore, the checking whether the operation of the AGV for each section meets the PLC control condition may include, when any one among the set PLC control conditions is not met, alarming a setting change of the corresponding condition and displaying the change in the setting on a display to change a PLC condition setting.

Furthermore, the method may further include after the operation d), when a stop event occurs while the AGV travels, changing a PLC memory value of a corresponding section PLC to a value meeting the travelling of the AGV and transmitting the changed value.

Various aspects of the present invention are directed to providing a system for operating an Autonomous Mobile Robot (AMR), the system including: an AMR which is loaded with a component in a vehicle production factory and transfers the component along a set travelling path; a Programmable Logic Controller (PLC) which is provided for each of a plurality of nodes existing in a process line and the traveling path and controls a surrounding automation facility; and an operation server which is configured to control an operation of the AMR and the automation facility through the PLC, and to set a PLC control condition for controlling the automation facility for each section by collecting PLC memory data from the PLC and inquiring the PLC memory data based on a movement position of the AMR when the travelling path is set.

According to the exemplary embodiment of the present invention, it is possible to improve efficiency of the work for operating the AGV by collecting the PLC state information for each process when new work is introduced and automatically setting a PLC memory value to interwork with the facility for each section according to the setting of the travelling path of the AGV.

Furthermore, it is possible to prevent a dangerous factor generable according to the actual operation of the AGV by checking whether the currently set PLC control condition meets the operation of the AGV in advance in the operation of setting a travelling condition through the generation of a path when new component transfer work is introduced or work is allocated.

Furthermore, it is possible to smoothly supply components to the right place at the right time by monitoring an operation state of the AGV and the automation facility through the PLC by the central operation server and controlling the immediate change in the PLC control condition for the generation of the stop event of the AGV.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 3 and FIG. 4 are diagrams illustrating an example of a screen for setting a Programmable Logic Controller (PLC) control condition and an interlock control condition through a UI of an operation condition setting unit according to the exemplary embodiment of the present invention.

It may be understood that the appended drawings are not necessarily to scale, presenting a somewhat simplified representation of various features illustrative of the basic principles of the present invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise", and variations such as "comprises" or "comprising", will be understood to imply the inclusion of stated elements but not the exclusion of any other elements. Furthermore, the terms "-er", "-or", and "module" described in the specification mean units for processing at least one function and operation, and may be implemented by hardware components or software components, and combinations thereof.

Throughout the specification, in describing the constructional elements of the present invention, the terms of a first, a second, A, B, (a), (b), or the like, may be used, but the constituent elements shall not be limited by the terms. Such a term is only for discriminating the constructional element from another constructional element, and does not limit the essential feature.

Throughout the specification, it should be understood that when one constituent element is referred to as being "coupled to" or "connected to" another constituent element, one constituent element may be directly coupled to or connected to the other constituent element, but intervening elements may further be present. In contrast, when one constituent element is "directly coupled to" or "directly connected to" another constituent element, it should be understood that there are no intervening element present.

The term used in the exemplary embodiment of the present invention is simply used for describing a specific embodiment and does not intend to limit the present invention. A singular expression includes a plural expression unless it is specifically described to the contrary in the context.

In the present application, it will be appreciated that terms "including" and "having" are intended to designate the existence of characteristics, numbers, steps, operations, constituent elements, and components described in the specification or a combination thereof, and do not exclude a possibility of the existence or addition of one or more other characteristics, numbers, steps, operations, constituent elements, and components, or a combination thereof in advance.

All terms used herein including technical or scientific terms have the same meanings as meanings which are generally understood by those skilled in the art unless they are differently defined in the exemplary embodiment of the present invention. Terms defined in generally used dictionary shall be construed that they have meanings matching those in the context of a related art, and shall not be construed in ideal or excessively formal meanings unless they are clearly defined in the present application.

Now, a system and a method of operating an automated guided vehicle according to various exemplary embodiments of the present invention will be described in detail with reference to the drawings.

Figure 1:
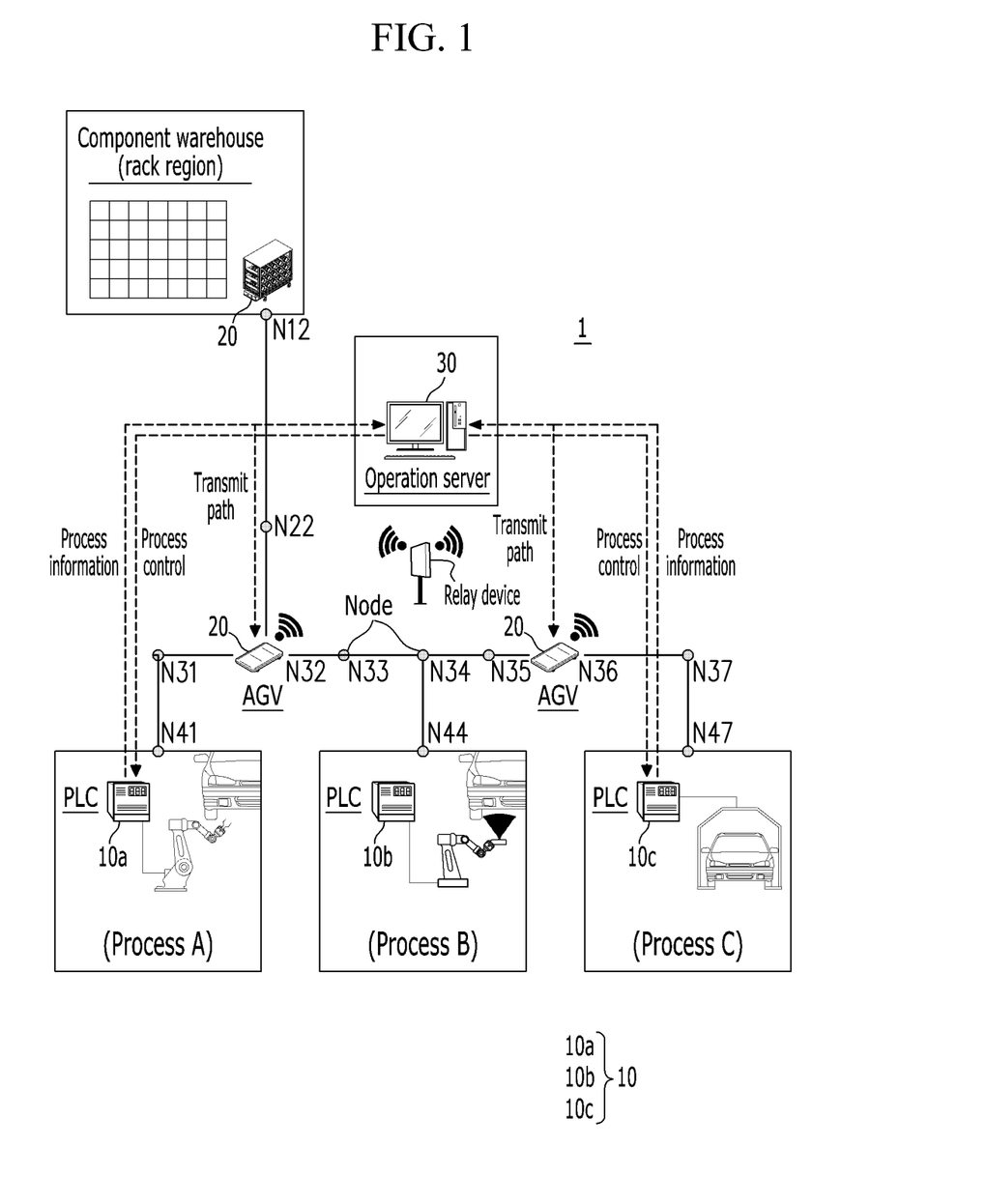
FIG. 1 is a conceptual diagram illustrating a system for operating an automated guided vehicle applied to a production line according to various exemplary embodiments of the present invention.

FIG. 1 is a conceptual diagram illustrating a system for operating an automated guided vehicle applied to a production line according to various exemplary embodiments of the present invention.

Figure 2:
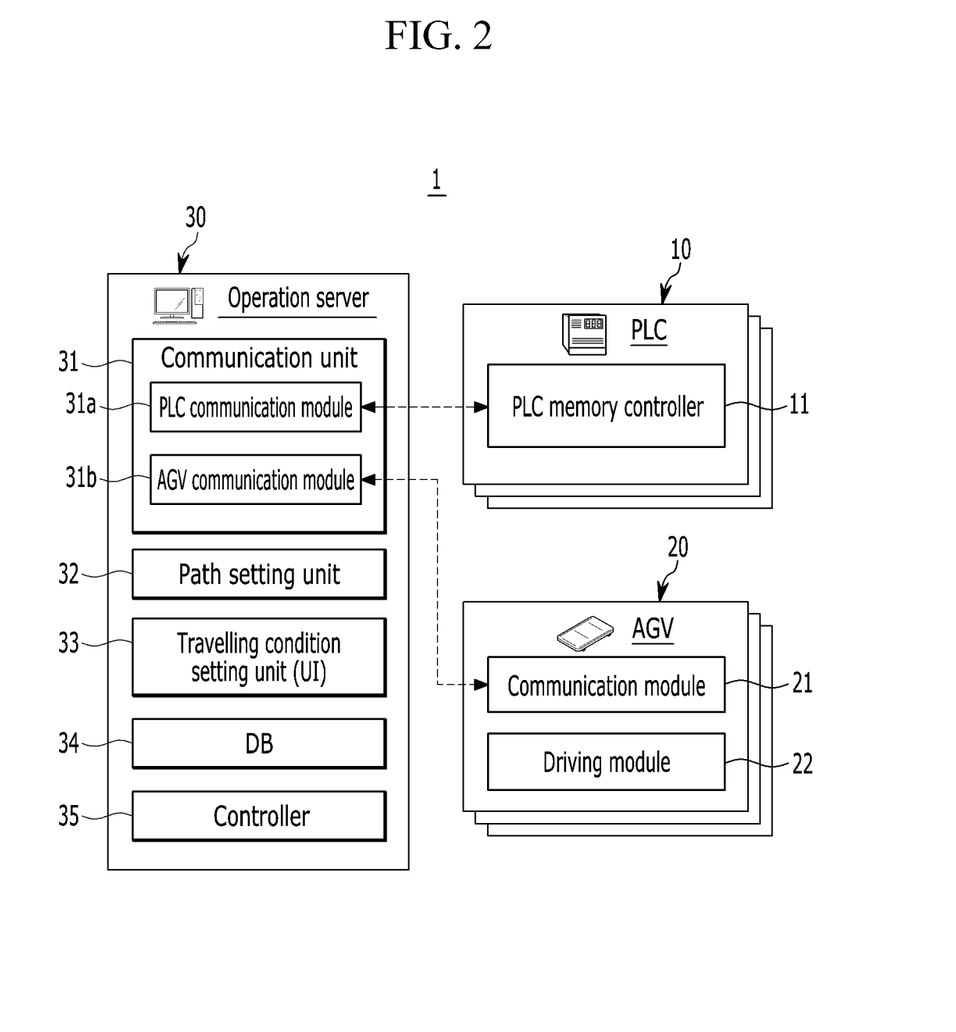
FIG. 2 is a block diagram schematically illustrating a configuration of the system for operating the automated guided vehicle according to the exemplary embodiment of the present invention.

FIG. 2 is a block diagram schematically illustrating a configuration of the system for operating the automated guided vehicle according to the exemplary embodiment of the present invention.

Referring to FIG. 1 and FIG. 2, a system 1 for operating an automated guided vehicle according to the exemplary embodiment of the present invention may be applied to an automation process of a vehicle production factory (for example, a smart factory).

The system 1 for operating an automated guided vehicle may include a Programmable Logic Controller 10 which directly controls automation facilities of various processes of assembling components, an Automated Guided Vehicle (hereinafter, referred to as the "AGV") 20 which transfers components, and an operation server 30 which operates the AGV 20 and controls the automation facilities through the PLC 10.

The PLC 10 is provided for each process line (for example, process A, process B, and process C), and includes a PLC memory controller 11 which controls an automation facility required for assembling components under an operation condition loaded to a PLC memory. Herein, the automation facility (hereinafter, also referred to as the "process facility) may include at least one of a robot, a conveyor, a component lifting/transferring means, jigs, and a component stock recognizing means provided in the process line.

The PLC 10 may control the automation facility provided not only in the process line, but also at a node through which the AGV 20 transferring a component passes. For example, the PLC 10 may open or close a door for the AGV 20 to enter and exit the booth in a painting process. Furthermore, the PLC 10 may also control an elevator for the AGV 20 to move the floors in a building-type factory.

The PLC memory controller 11 is loaded with a conditional statement-based program for controlling an operation of the automation facility formed of mechanical equipment, and log information according to an operation state and an operation history of the automation facility is stored in the PLC memory.

The PLC memory controller 11 may recognize an operation state of the automation facility and a movement position (position and direction) of the AGV 20, and operate or stop the automation facility according to the program loaded to the PLC memory.

For example, when the PLC memory controller 11 recognizes that the AGV 20 enters a corresponding process section during an operation of the process facility, the PLC memory controller 11 may perform interlock control that temporarily stops the operation of the process facility for preventing interference or collision with the AGV 20. Furthermore, when the PLC memory controller 11 recognizes that the AGV 20 enters a corresponding process section during an operation of the process facility, the PLC memory controller 11 may transmit an operation state of the process facility to the AGV 20 and perform interlock control that temporarily stops the AGV 20. The control of the interlock of the PLC memory controller 11 and the AGV 20 may be implemented through PLC memory setting by the operation server 30.

The AGV 20 may transfer components along the travelling path set by the operation server 30, and may include a sensor for detecting magnetic force of the magnetic guide line, a communication module 21, and a driving module 22.

The communication module 21 performs communication with the operation server 30 through a wireless relay device, and receives the travelling path of the AGV 20 according to task assignment from the operation server 30.

The travelling path includes a plurality of nodes including a starting point at which the AGV 20 needs to travel, one or more via points, and an end point. Furthermore, a link section connected in a travelling direction of the AGV 20 exists between the nodes.

For example, referring to FIG. 1, it is assumed that the AGV 20 is loaded with the component in a component warehouse N12 and moves process A, N41 via the plurality of nodes. In the instant case, the travelling path of the AGV 20 may be set as N12-N22-N32-N31-N41. That is, the travelling path of the AGV 20 may be set in the order of a start point N12, via points N22, N32, and N31, and an end point N42 according to identification information (ID) of each node.

The communication module 21 of the AGV 20 may recognize a marker disposed in the travelling path or detect a movement position of the AGV 20 through a Differential Global Positioning System (DGPS) and transmit the recognized marker or detected movement position to the operation server 30.

Furthermore, the communication module 21 of the AGV 20 may transceiver state information with the PLC 10 existing in the travelling path based on the movement position of the AGV 20.

The driving module 22 of the AGV 20 stores a factory map MAP and a coordinate of a node to which the AGV 20 is movable, and controls a driving device of the AGV 20 including a motor so that the AGV 20 is configured for moving along the travelling path.

The driving module 22 includes a controller and a memory for controlling the AGV 20, and may recognize the position of the AGV 20 and state information of the PLC 10 existing on the travelling path of the AGV 20 and control the AGV 20 according to a set program. The control of the AGV 20 includes interlock control.

The operation server 30 according to the exemplary embodiment of the present invention is a sort of determining system controlling the AGV 20 operated in the vehicle production factory at a center.

The operation server 30 recognize process information by collecting the PLC memory data of the PLC 10 disposed for each process of the vehicle production factory, inquires for the PLC memory data based on the movement position of the AGV 20 when a travelling path for transferring the component is set, and sets a PLC control condition for controlling the operation of the automation facility for each section. Herein, the section means a path between the nodes of the travelling path of the AGV 20.

The operation server 30 may include a communication unit 31, a path setting unit 32, a travelling condition setting unit 33, a database (DB) 34, and a controller 35.

The communication unit 31 includes a PLC communication module 31a performing wire or wireless communication with the PLC 10 which is being operated in the vehicle production factory, and an AGV communication module 31b performing wire or wireless communication with the AGV 20.

The PLC communication module 31a collects data loaded to each PLC memory through the communication with the PLC 10. The data loaded to the PLC memory includes a PLC control condition for operating the corresponding automation facility.

When new process work is introduced or existing process work is changed, the PLC communication module 31a may transmit the PLC control condition set according to the travelling path of the AGV 20 to the PLC 10.

The AGV communication module 31b collects a real-time movement position of the AGV 20 through the wireless communication with the AGV 20.

Furthermore, the AGV communication module 31b may transmit an AGV travelling condition for interworking the travelling path generated for the transfer of the component with the PLC 10 located at each node to the AGV 20.

The path setting unit 32 generates the travelling path of the AGV 20 which is being operated in the vehicle production factory.

The path setting unit 32 may generate the travelling path of the AGV 20 required for transferring the component for each process. For example, when it is assumed that the AGV 20 located in the component warehouse N12 of FIG. 1 is loaded with the component and moves to process A N41 via the plurality of nodes, the travelling path of the AGV 20 may be set as N12-N22-N32-N31-N41.

The travelling path may be set with a coordinate for each node to which the AGV 20 is movable on the factory map MAP in consideration of the position of each process and the size of the component. Furthermore, the travelling path may include a supply path to which the component is transferred from the component warehouse to a specific process line, and a regression path through which the AGV returns in the reverse order.

The travelling condition setting unit 33 sets a memory address of the PLC memory and the PLC control condition for controlling the operation of the automation facility for each section according to the travelling path generated by the path setting unit 32, and sets an AGV travelling condition interworking with the PLC control condition.

The travelling condition setting unit 33 includes a user interface (User Interface, UI) in which an input environment for setting the PLC control condition and the AGV travelling condition is programmed.

Figure 3:
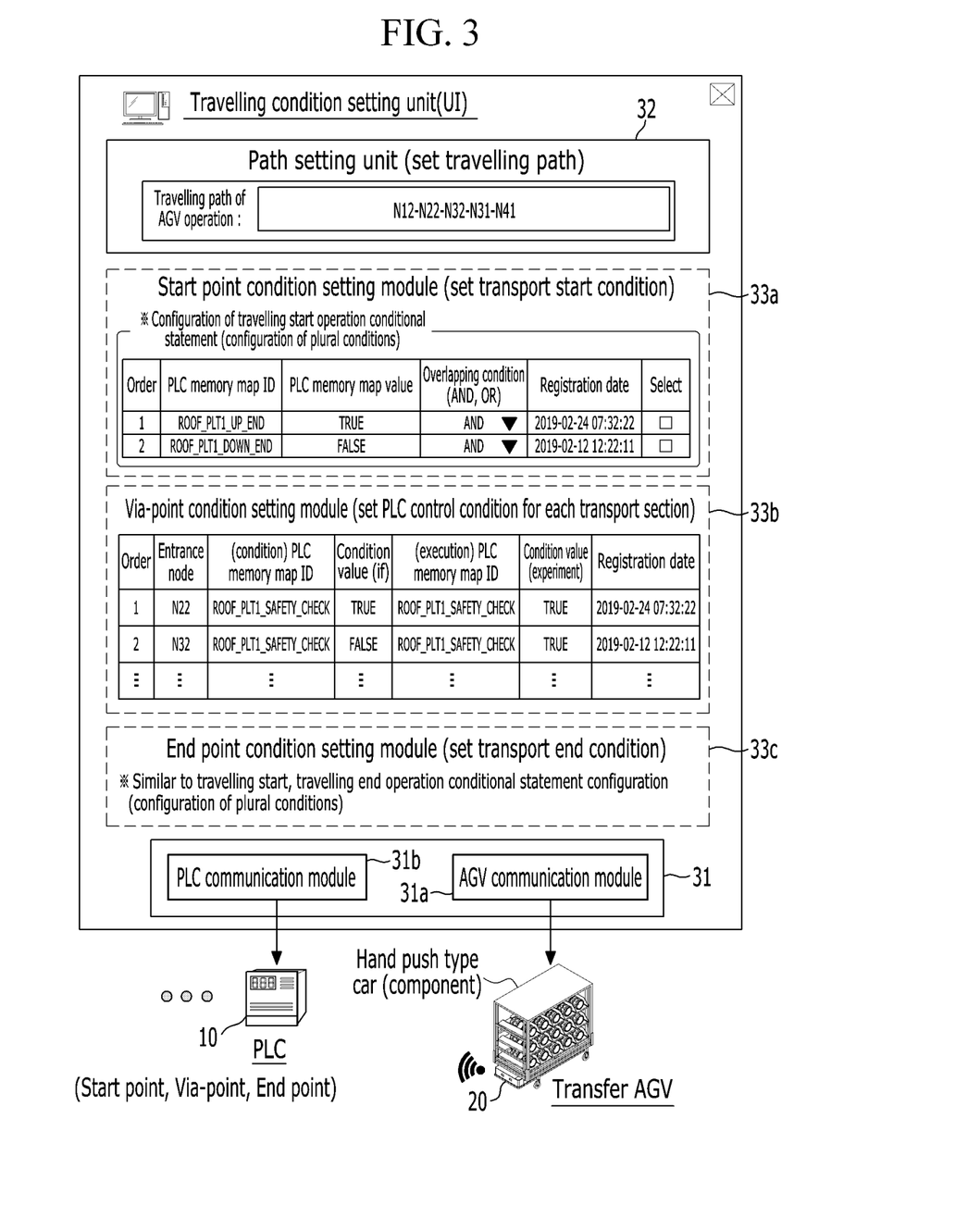

FIG. 3 and FIG. 4 are diagrams illustrating an example of a screen for setting the PLC control condition and the interlock control condition through the UI of a travelling condition setting unit according to the exemplary embodiment of the present invention.

Referring to FIG. 3, when the travelling path of the AGV 20 is generated in the path setting unit 32, the travelling condition setting unit 33 may set the travelling condition of the automation facility and the AGV at a start point, via points, and an end point.

The travelling condition setting unit 33 may designate a memory value set in the PLC memory of each PLC 10 as a condition value in consideration of the movement position of the AGV 20. For example, when a memory value input to each memory address of the PLC memory is true or false, the PLC control condition may be set with a combination condition of the memory value. The combination condition may be an AND or OR condition. The PLC control condition may include the memory value input to each memory address of the PLC memory and the combination condition.

In the instant case, the travelling condition setting unit 33 recognizes whether the PLC control condition set in the specific process meets the operation of the AGV 20 (or the AGV travelling condition), and when the PLC control condition does not meet the operation of the AGV 20 (or the AGV travelling condition), the travelling condition setting unit 33 may generate an alarm.

Furthermore, when a stop issue (event) occurs at a specific node or a section between the nodes by monitoring the movement position while the AGV 20 travels, the travelling condition setting unit 33 may change the PLC memory value of the corresponding PLC 10 to a value meeting the travelling of the AGV 20 and transmit the changed value.

The travelling condition setting unit 33 may include a start point condition setting module 33a, a via-point condition setting module 33b, and an end point condition setting module 33c, and the UI of the travelling condition setting unit 33 may display the start point condition setting module 33a, the via-point condition setting module 33b, and the end point condition setting module 33c so that the operator is capable of setting the PLC control condition. As necessary, the UI of the travelling condition setting unit 33 may display the travelling path set in the path setting unit 32.

The UI of the travelling condition setting unit 33 inquires and displays PLC control conditions already stored in the automation facilities disposed at the start point, the plurality of via points, and the end point based on the movement position on the travelling path of the AGV 20 by referring to the collected PLC memory data.

When it is assumed that the travelling path for operating the AGV 20 is set as N12-N22-N32-N31-N41, the start point condition setting module 33a sets the PLC start condition for operating the AGV 20 at the start point N12.

The PLC start condition may be the plurality of PLC control conditions including an operation of checking the stock of the components based on various sensors provided in the component warehouse N12, an operation of setting an operation condition of the process facility (for example, the lifting device or the transfer robot) for picking up the component, an operation of detecting whether the component is completely loaded to the AGV 20, and the like.

When the PLC start condition is set, the start point condition setting module 33a may automatically set the PLC memory value of the PLC 10 controlling the automation facility disposed in the component warehouse N12 which is the start point to a table. Furthermore, the start point condition setting module 33a may display the PLC memory value set through the UI, and the operator may change the PLC memory value through the UI as necessary.

Furthermore, the start point condition setting module 33a may have a monitoring function of checking in advance whether the set PLC memory value meets the actual operation of the AGV 20 and the sequence condition (or the PLC control condition) of the automation facility that loads the component. This is for pre-checking whether the precedent condition according to the table order of the PLC memory values meets the corresponding condition for the performance through the simulation, and supplementing the PLC memory value which is not executable due to various reasons in the setting operation.

In the instant case, when the set PLC memory value meets the operation of the AGV 20 as the result of the pre-monitoring, the start point condition setting module 33a displays the PLC memory value with green meaning normal through the UI, and when the PLC memory value does not meet the sequence condition, the start point condition setting module 33a displays the PLC memory value with yellow meaning abnormal through the UI. That is, the UI of the travelling condition setting unit may display whether the PLC memory value according to the PLC control condition setting meets the operation of the AGV by color. Herein, the display of the normal case by color is one example, and may be changed according to a design.

Similarly, in the via-point condition setting module 33b and the end-point condition setting module 33c, the PLC conditions for operating the AGV 20 in each node section are set.

For example, in the via-point condition setting module 33b, the PLC memory values may be set to open or close a door in the movement path, or perform a series of sequences of opening/closing the door of the elevator, the movement up and downwards, and the opening/closing the elevator.

Furthermore, in the end point condition setting module 33c, the PLC memory values may be set to perform a series of sequences for unloading the component by the process facility, such as a robot, according to the arrival at the end point of the AGV 20.

The set PLC memory values means the PLC control condition setting values set in the PLC memory of the PLC 10 for the control of the corresponding facility at the time point at which the AGV 20 passes through each corresponding section, and whether at least one condition for the operation is met may be displayed by color as described above.

In the meantime, referring to FIG. 4, the travelling condition setting unit 33 may set an interlock control condition for preventing the AGV 20 and the automation facility 10 from interfering or colliding with each other before the AGV 20 enters the specific node of the travelling path. As necessary, the operator may also set the interlock control condition through the UI of the travelling condition setting unit 33.

For example, when the automation facility, such as the robot, is being operated before the AGV 20 enters the end point N41 of the travelling path, the operator may set the interlock control condition so that the AGV 20 is temporarily stopped to prevent the automation facility and the AGV 20 from interfering or colliding with each other, and make the AGV 20 stand by until the operation of the automation facility is terminated. In contrast to this, the operator may set the interlock control condition in which when it is detected that the AGV 20 enters the end point N41, the operation of the automation facility is interrupted, and after the completion of the entrance of the AGV 20, the operation of the automation facility is resumed.

Through the interlock control, when the AGV 20 moves from the start point to the end point, it is possible to prevent the AGV 20 and the automation facility from colliding or interfering with each other and stably transfer the component.

The DB 34 of the operation server 30 stores various programs and data for operating the AGV 20 according to the exemplary embodiment of the present invention, and stores the PLC memory data collected according to the operation of the AGV 20.

The controller 35 is a sort of central processing unit which controls the general operation of each unit and each module of the operation server for operating the AGV according to the exemplary embodiment of the present invention.

The controller 35 may execute a function of each unit and each module by executing the program stored in the DB 34 and referring the data, and may be a substantive control subject.

The controller 35 collects the state information from the PLC 10 disposed in the vehicle factory through the PLC communication module 31a, and sets the PLC memory value to interwork with the PLC 10 controlling the automation facility on the travelling path when the travelling path of the AGV 20 is set. Furthermore, the controller 35 may control the operation of the automation facility by transmitting the PLC memory value corresponding to the PLC memory address of the PLC 10 disposed at the position of the AGV 20. The automation facility includes mechanical facilities, such as a door and an elevator, as well as the process facility operated in each node.

Accordingly, the operation server 30 including the controller 35 may monitor the operation states of the automation facilities through the PLC 10 disposed in the vehicle factory, and control the operations of the automation facilities disposed at the movement position of the AGV 20 through the PLC 10.

To the present end, the controller 35 may be implemented by one or more processors operated by the program set for the operation of the AGV, and the set program may be programmed to perform each operation of a method of operating the AGV according to the exemplary embodiment of the present invention. The method of operating the AGV will be described in more detail with reference to the following drawings.

Figure 5:
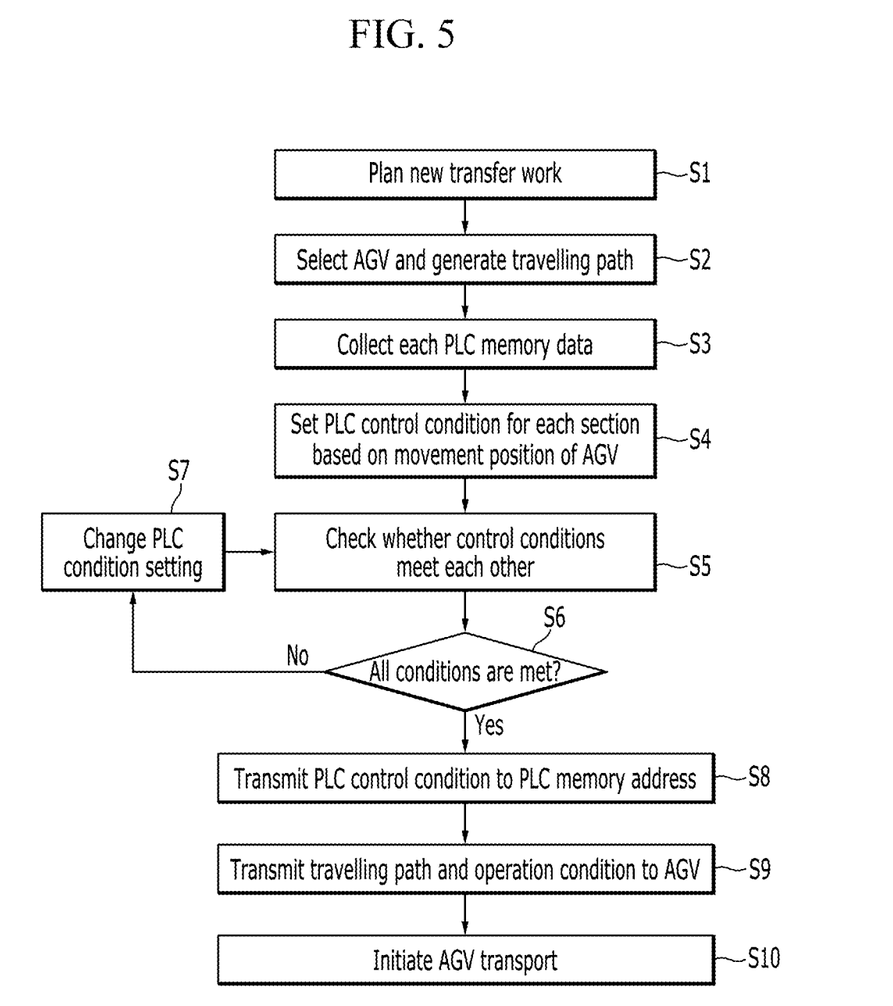
FIG. 5 is a flowchart schematically illustrating a method of operating an AGV by an operation server according to various exemplary embodiments of the present invention.

FIG. 5 is a flowchart schematically illustrating a method of operating an AGV by an operation server according to various exemplary embodiments of the present invention.

Referring to FIG. 5, the controller 35 of the operation server 30 according to the exemplary embodiment of the present invention plans work for operating the AGV 20 when transfer work according to an addition of a new process is introduced to the vehicle production factory (S1).

The controller 35 selects the AGV 20 appropriate to the transfer of a component in consideration of the type and a size of the component required for the process, and generates a travelling path from a start point to an end point through the path setting unit 32 (S2). For example, the travelling path may include node information from the start point which is the component warehouse, the plurality of via points, and the end point of the corresponding process.

The controller 35 collects PLC state information including each PLC memory data from the PLC 10 of the node included in the travelling path through the PLC communication module 31a (S3).

The controller 35 inquires the collected PLC memory data based on a movement position of the AGV 20 and sets a PLC control condition for operating an automation facility for each section through the travelling condition setting unit 33 (S4). The PLC control condition may be set by the travelling condition setting unit 33, but may further be manually set by the operator through the UI of the travelling condition setting unit 33.

The travelling condition setting unit 33 may additionally set the interlock control condition of stopping the AGV 20 immediately before the AGV 20 enters the specific node based on the movement position of the AGV 20, or stopping the automation facility through the PLC 10.

When the operator sets the PLC control condition through the UI of the travelling condition setting unit 33, the controller 35 checks whether the operation of the AGV 20 meets the PLC control condition input by the operator (S5). Through this, a dangerous factor generable by the travelling of the AGV 20 and the operation of the automation facility controlled by the PLC 10 may be simulated and monitored in advance.

When the PLC control condition set in the travelling condition setting unit 33 does not meet the operation of the AGV 20 (S6, NO), the controller 35 may generate an alarm to the operator through the UI of the travelling condition setting unit 33 to change the setting of the corresponding PLC control condition (S7).

When all of the PLC control conditions set in the travelling condition setting unit 33 meet the operation of the AGV 20 (S6, YES), the controller 35 transmits the PLC control condition of the PLC memory matched to a memory address of each PLC 10 through the PLC communication module 31a (S8). Each PLC 10 may store the PLC control condition in the corresponding PLC memory, and control the automation facility around the AGV 20 through the operation interworked with the AGV 20 arrived at the corresponding node section later.

Furthermore, the controller 35 transmits the travelling path the node on the traveling path, and an operation condition under which the AGV 20 needs to perform for each movement section between the nodes through the AGV communication module 31b (S9).

Accordingly, the AGV 20 is disposed into the component transfer work, loads the component through the interworking with the PLC 10 from the start point of the travelling path, and then initiates the travelling.

Accordingly, a stop event in which the AGV 20 needs to be temporarily stopped due to an issue, such as deviation of the travelling path due to malfunction of the sensor or a communication error while the AGV 20 travels may occur.

When an unexpected stop event occurs at the specific node or the section between the nodes while the AGV 20 travels, the controller 35 may control the smoothly travelling by changing the PLC memory value of the PLC 10 in the corresponding section to the value meeting the travelling of the AGV 20 and transmitting the changed value.

The method of operating the AGV described with reference to FIG. 5 has been described with the controller 35 as the subject, but the controller 35 is the detailed configuration taking in charge of controlling the operation server 30, so that it is apparent that the method may be described with the operation server 30 as the subject.

According to the exemplary embodiment of the present invention described above, it is possible to improve efficiency of the work for operating the AGV by collecting the PLC state information for each process when new work is introduced and automatically setting the PLC memory value to interwork with the automation facility on the travelling path of the AGV.

Furthermore, it is possible to prevent a dangerous factor generable according to the operation of the AGV by checking whether the set PLC control condition meets the operation of the AGV in advance.

Furthermore, it is possible to smoothly supply components to the right place at the right time by monitoring through the PLC, by the operation server, the operation states of the AGV and the automation facility and controlling the immediate change in the PLC control condition for the generation of the stop event of the AGV.

In the above, the exemplary embodiment of the present invention has been described, but the present invention is not limited only to the foregoing exemplary embodiment of the present invention, and other various modifications are possible.

For example, in the exemplary embodiment of the present invention, it is described that the industrial transportation vehicle is formed of the AGV, but the exemplary embodiment of the present invention is not limited thereto, and the industrial transportation vehicle may be implemented with an Autonomous Mobile Robot (AMR).

Figure 6:
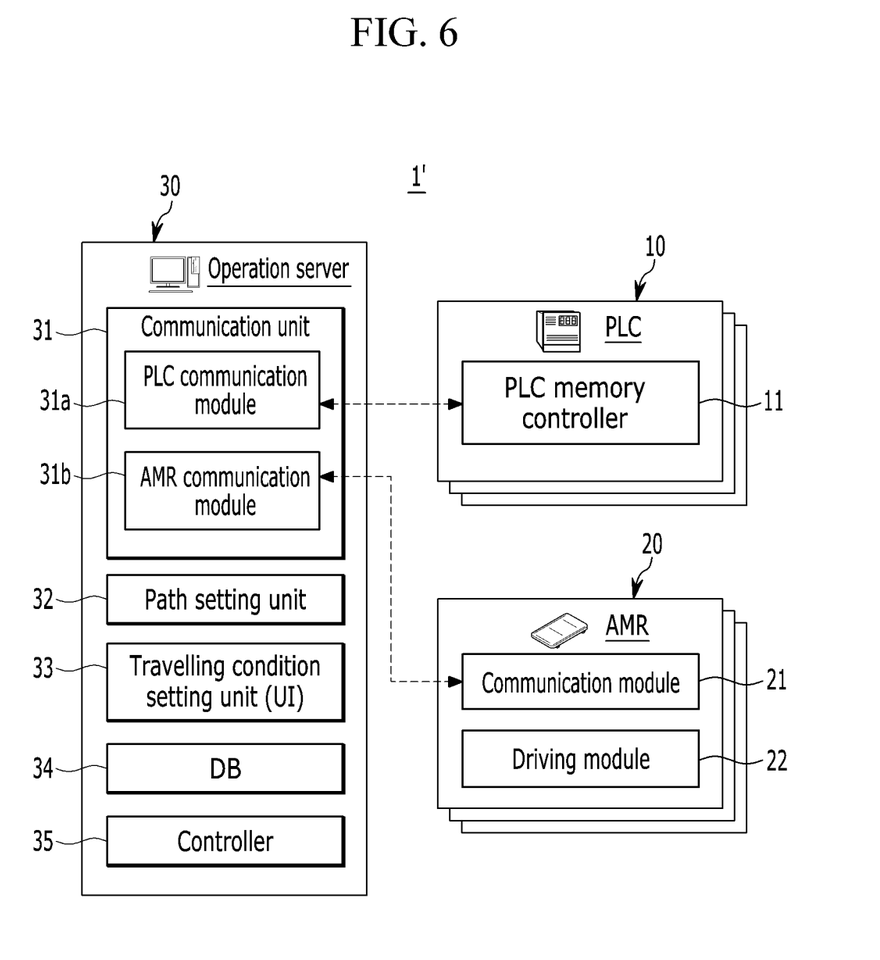
FIG. 6 is a block diagram schematically illustrating a configuration of a system for operating an autonomous mobile robot according to various exemplary embodiments of the present invention.

FIG. 6 is a block diagram schematically illustrating a configuration of a system for operating an AMR according to various exemplary embodiments of the present invention.

Referring to FIG. 6, the exemplary embodiment of the present invention is similar to the configuration of FIG. 2 according to the exemplary embodiment of the present invention, and only a difference is that the industrial transportation vehicle 20 is formed of the AMR, not the AGV.

Herein, the AGV moves through the sensor configured for detecting the magnetic guide line, and the AMR autonomously moves to a destination while detecting the surrounding area through a sensor, such as a camera, a Light Detection and Ranging (LiDAR), a laser, and DGPS, and avoiding an obstacle, which is the difference. The AGV and the AMR are substantially the same in that they are used for unmanned logistics transport in an industrial field.

That is, in another exemplary embodiment of the present invention, the AMR 20 travels along a travelling path from a starting point to an end point by passing through via points for transporting a component for each process according to a production plan, which is the same as the AGV. Accordingly, it is possible to build an AMR operation system 1' through the interworking configuration between a PLC 10 and an operation server 30.

The system 1' for operating the AMR may be implemented in substantially the same manner as that of the exemplary embodiment of the present invention, except for operating the AMR, so that redundant description will be omitted.

The exemplary embodiments of the present invention are not implemented only through the device and/or method described above, and may also be implemented through a program for realizing a function corresponding to the configuration of the exemplary embodiments of the present invention, a recording medium in which the program is recorded, and the like, and the implementation may be easily implemented by those skilled in the art from the description of the foregoing exemplary embodiment of the present invention.

Although various exemplary embodiments of the present invention have been described in detail, the scope of the present invention is not limited by the embodiment. Various changes and modifications using the basic concept of the present invention defined in the accompanying claims by those skilled in the art shall be construed to belong to the scope of the present invention.

Furthermore, the term related to a control device such as "controller", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present invention.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present invention, each operation described above may be performed by a control device, and the control device may be configured by a plurality of control devices, or an integrated single control device.

In various exemplary embodiments of the present invention, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A system for operating an automated guided vehicle (AGV), the system comprising:
 the AGV configured to be loaded with a component and to transfer the component along a set travelling path;
 a Programmable Logic Controller (PLC) which controls each of at least one or more automation facilities provided in a process line and at each of a plurality of nodes provided on the travelling path; and
 an operation server which is configured to control an operation of the AGV and each automation facility through the PLC, and to control each of the at least one or more automation facilities for each of sections between the nodes by collecting PLC memory data from the PLC and inquiring the PLC memory data based on a movement position of the AGV when the travelling path is set,
 wherein the PLC includes a PLC memory controller in which a conditional statement-based program for controlling an operation of each automation facility is loaded and which stores log information according to an operation state and an operation history of each automation facility in a PLC memory, and
 wherein the PLC memory controller is configured to recognize the operation state of each automation facility and the movement position of the AGV, and to control an operation or a stop of each automation facility according to whether a condition set in the PLC memory is satisfied.

2. The system of claim 1, wherein the AGV includes:
 a communication module which is configured to receive the travelling path from the operation server and to transmit the movement position of the AGV to the operation server; and
 a driving module which is configured to store a factory map and a coordinate of a node to which the AGV is configured for moving among the plurality of nodes, and controls a driving device of the AGV.

3. The system of claim 1, wherein the travelling path includes the plurality of nodes having a start point, one or more via-points, and an end point of the AGV.

4. The system of claim 3, wherein the travelling path further includes a supply path to which the component is transferred from a component warehouse to the process line based on a coordinate system of a factory map, and a regression path through which the AGV returns in a reverse order.

5. The system of claim 1, wherein the operation server includes:
 a PLC communication module which is configured to collect each set PLC memory data by performing communication with the PLC;
 an AGV communication module which is configured to collect a real-time movement position of the AGV by performing communication with the AGV;
 a path setting unit which is configured to generate the travelling path of the AGV for transferring the component for each process line;
 a travelling condition setting unit which is configured to set a PLC memory address of a PLC memory and a PLC control condition for an operation of each automation facility for each section according to the travelling path, and to set an AGV travelling condition for interworking with the PLC control condition;
 a database which stores programs and the PLC memory data for operating the AGV; and
 a controller which is configured to control the operation of each automation facility by transmitting the PLC control condition by designating the PLC memory address of the PLC for each section according to the movement position of the AGV.

6. The system of claim 5, wherein the travelling condition setting unit includes a user interface (UI) in which an input environment for setting the PLC control condition and the AGV travelling condition for each node of the travelling path is programmed.

7. The system of claim 6, wherein the UI of the travelling condition setting unit is configured to display a screen, which includes a start point condition setting module, a via-point condition setting module, and an end point condition setting module for the traveling path, for setting the PLC control condition by a user on a display.

8. The system of claim 6, wherein the UI of the travelling condition setting unit inquires the PLC control condition registered for a start point, a via-point, and an end point based on the movement position on the travelling path of the AGV by referring to the collected PLC memory data and displays the PLC control condition to the user.

9. The system of claim 6, wherein the UI of the travelling condition setting unit is configured to display whether a PLC memory value according to the setting of the PLC control condition meets the operation of the AGV by color.

10. The system of claim 6, wherein the travelling condition setting unit is configured to set an interlock control condition which, for a predetermined time period, stops the AGV or a process facility when the process facility is being operated before the AGV enters an end point of the travelling path.

11. A method of operating an Automated Guided Vehicle (AGV) in which an operation server of a vehicle production factory transfers a component, the method comprising:
 selecting the AGV for transferring the component in consideration of a type and a size of the component when component transfer work is planned, and generating a travelling path from a start point to an end point thereof;
 collecting each of Programmable Logic Controller (PLC) memory data from a Programmable Logic Controller which is provided for each of a plurality of nodes existing on the travelling path and controls a surrounding automation facility among at least one or more automation facilities;
 inquiring the PLC memory data and setting a PLC control condition for operating [the] an automation facility among the at least one or more automation facilities for each section based on a movement position of the AGV; and
 transmitting the PLC control condition matched to a memory address of the PLC for each section, and transmitting the travelling path and an operation condition for each section to the AGV,
 wherein the PLC includes a PLC memory controller in which a conditional statement-based program for controlling an operation of each automation facility of the at least one or more automation facilities is loaded and which stores log information according to an operation state and an operation history of each automation facility in a PLC memory, and wherein the PLC memory controller is configured to recognize the operation state of each automation facility of the at least one or more automation facilities and the movement position of the AGV, and to control an operation or a stop of each automation facility of the the at least one or more automation facilities according to whether a condition set in the PLC memory is satisfied.

12. The method of claim 11, wherein the inquiring the PLC memory data and setting a PLC control condition for operating the automation facility for each section based on a movement position of the AGV, includes setting an interlock control condition for selectively stopping a facility through the AGV or the Programmable Logic Controller before the AGV enters a node among the plurality of nodes based on the movement position.

13. The method of claim 11, wherein the inquiring the PLC memory data and setting the PLC control condition for operating the automation facility for each section based on the movement position of the AGV, includes checking whether operation of the AGV for each section meets the PLC control condition when the PLC control condition is set.

14. The method of claim 13, wherein whether the operation of the AGV meets the PLC control condition is displayed by color.

15. The method of claim 11, further including:
after the transmitting the PLC control condition matched to the memory address of the PLC for each section and the transmitting the travelling path and the operation condition for each section to the AGV when a stop event occurs while the AGV travels, changing a PLC memory value of a corresponding section PLC to a value meeting travelling of the AGV and transmitting the changed value.

16. A system for operating an Autonomous Mobile Robot (AMR), the system comprising:
the AMR which is loaded with a component in a vehicle production factory and transfers the component along a set travelling path;
a Programmable Logic Controller (PLC) which is provided for each of a plurality of nodes existing in a process line and the traveling path and is configured to control a surrounding automation facility of at least one or more automation facilities; and
an operation server which is configured to control an operation of the AMR and the automation facility through the PLC, and to set a PLC control condition for controlling an automation facility among the at least one or more automation facilities for each of sections between the nodes by collecting PLC memory data from the PLC and inquiring the PLC memory data based on a movement position of the AMR when the travelling path is set,
wherein the PLC includes a PLC memory controller in which a conditional statement-based program for controlling an operation of each automation facility of the at least one or more automation facilities is loaded and which stores log information according to an operation state and an operation history of each automation facility of the at least one or more automation facilities in a PLC memory, and
wherein the PLC memory controller is configured to recognize the operation state of each automation facility and the movement position of the AGV, and to control an operation or a stop of each automation facility of the at least one or more automation facilities according to whether a condition set in the PLC memory is satisfied.

* * * * *